(12) United States Patent
Blomqvist et al.

(10) Patent No.: US 7,727,623 B2
(45) Date of Patent: Jun. 1, 2010

(54) METHOD AND APPARATUS FOR MAKING PLATE-LIKE FIBER-REINFORCED PRODUCTS

(75) Inventors: Mikael Blomqvist, Espoo (FI); David Moon, Dorchester (GB)

(73) Assignee: Selvaag Spinoff AS, Oslo (FI)

( * ) Notice: Subject to any disclaimer, the term of this patent is extended or adjusted under 35 U.S.C. 154(b) by 686 days.

(21) Appl. No.: 11/675,550

(22) Filed: Feb. 15, 2007

(65) Prior Publication Data

US 2007/0141189 A1   Jun. 21, 2007

Related U.S. Application Data

(62) Division of application No. 10/561,731, filed as application No. PCT/FI03/00442 on Jun. 4, 2003, now Pat. No. 7,241,407.

(30) Foreign Application Priority Data

Jun. 5, 2002   (FI) .................................. 20021078

(51) Int. Cl.
*B32B 13/02* (2006.01)
(52) U.S. Cl. .................................. 428/294.7; 428/297.1
(58) Field of Classification Search ............ 428/294.7, 428/297.1, 317.9; 106/711; 442/370, 374
See application file for complete search history.

(56) References Cited

U.S. PATENT DOCUMENTS

| 3,860,371 | A | 1/1975 | Willy |
| 4,043,719 | A | 8/1977 | Jones |
| 4,808,229 | A * | 2/1989 | Arhelger ..................... 106/711 |
| 4,981,427 | A | 1/1991 | Prignitz |
| 5,089,189 | A | 2/1992 | Staneluis et al. |
| 6,117,375 | A | 9/2000 | Garrett et al. |
| 6,841,230 | B2 * | 1/2005 | Yokoo et al. ............. 428/294.7 |
| 7,241,407 | B2 * | 7/2007 | Blomqvist et al. ......... 264/46.2 |
| 2006/0024506 | A1 * | 2/2006 | Blomqvist et al. ....... 428/422.8 |
| 2007/0141189 | A1 * | 6/2007 | Blomqvist et al. ......... 425/81.1 |

FOREIGN PATENT DOCUMENTS

| DE | 2005304 | 8/1971 |
| EP | 0831185 | 3/1998 |
| FI | 862914 | 1/1987 |
| JP | 63172633 | 7/1988 |
| JP | 2182440 | 7/1990 |
| JP | 6122128 | 5/1994 |

* cited by examiner

*Primary Examiner*—N. Edwards
(74) *Attorney, Agent, or Firm*—Oliff & Berridge, PLC

(57) ABSTRACT

A method for making a plate-like fiber-reinforced product to be used as building or packing material, the method comprising: placing fibers on a lower laminate; applying a binding agent on the fibers so that the fibers are surrounded by the binding agent; transferring the fibers with binding agent between the lower laminate and an upper laminate between lower and upper rotating pressing plates; allowing the binding agent to foam up, expand and harden between the upper and lower pressing plates. A manufacturing apparatus and a plate-like product are also indicated.

3 Claims, 3 Drawing Sheets

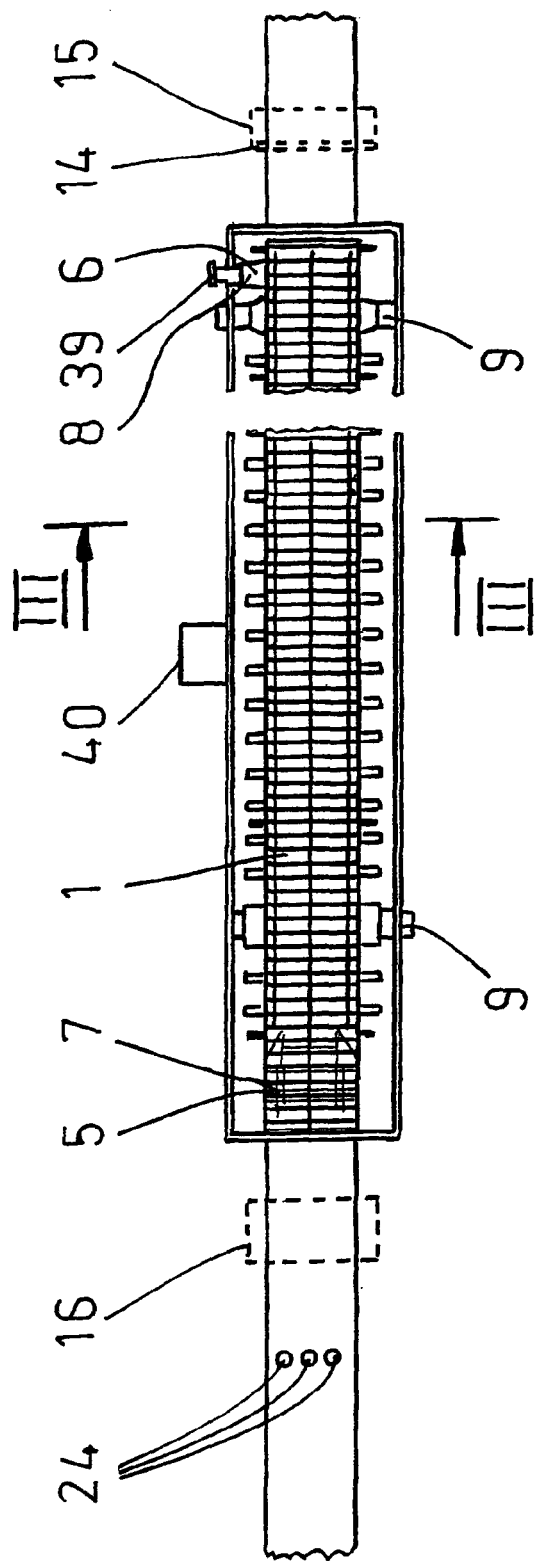
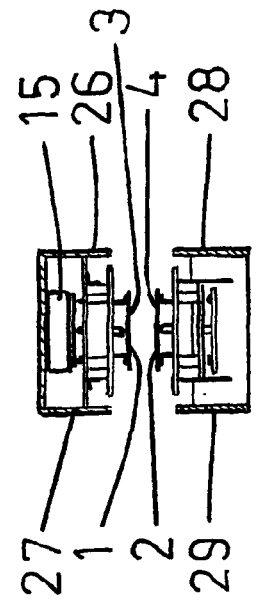
FIG. 3
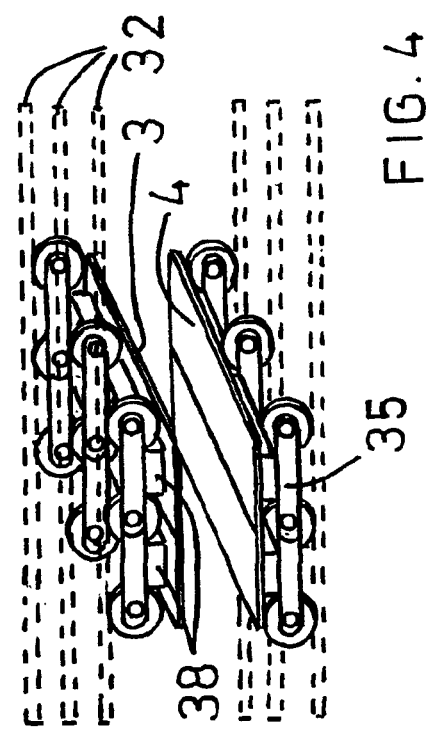
FIG. 4

METHOD AND APPARATUS FOR MAKING PLATE-LIKE FIBER-REINFORCED PRODUCTS

This is a Division of application Ser. No. 10/561,731 filed Dec. 6, 2004, which in turn is a U.S. national stage application of Application No. PCT/FI03/00442 filed Jun. 4, 2003. The entire disclosures of the prior applications are incorporated herein by reference.

BACKGROUND OF THE INVENTION

The invention relates to a method and an apparatus for making a plate-like fibre-reinforced composite product to be used as building or packing material. The invention also relates to a similar plate-like fibre reinforced composite product.

More particularly, the invention relates to a method for making a plate-like fibre-reinforced composite product to be used as building or packing material, the method comprising: placing fibres on a lower laminate, applying a foaming hardening binding agent in liquid form on the fibres so that the fibres are surrounded by the binding agent, transferring the fibres with binding agent between the lower laminate and an upper laminate between lower and upper pressing plates arranged to rotate endlessly on the upper, respectively the lower, side of the fibres with the binding agent so that the fibres with the binding agent are transferred by means of the rotation speed of the pressing plates, and allowing the binding agent to foam up, expand and harden between the upper and lower pressing plates More particularly, the present invention also relates to an apparatus for making a plate-like fibre-reinforced composite product to be used as building or packing material, the apparatus comprising an inlet end for receiving fibres surrounded by binding agent, an outlet end for providing the plate-like fibre-reinforced composite product manufactured in the apparatus, an upper endlessly rotating belt comprising a plurality of upper pressing plates, which controlled by at least two elongated control elements extending in the longitudinal direction of the apparatus are arranged to move on an upper end-less track, and a lower endlessly rotating belt comprising a plurality of lower pressing plates, which controlled by at least two elongated control elements extending in the longitudinal direction of the apparatus are arranged to move on a lower endless track, whereby the upper pressing plates within an area of the upper endless track are arranged on a first substantially flat plane and the lower pressing plates within an area of the lower endless track are arranged on a second substantially flat plane, which is parallel to the first flat plane, whereby the upper and lower pressing plates within the area are arranged to transfer the fibres surrounded by the binding agent between them, feed means for feeding an upper laminate and a lower laminate in said area, the upper laminate is arranged to be supported in said area against the upper pressing plates and to move at the same speed as the upper pressing plates, and the lower laminate is arranged to be supported in said area against the lower pressing plates and to move at the same speed as the lower pressing plates, More precisely, the present invention further relates to a plate-like fibre-reinforced composite product comprising fibres surrounded by a binding agent to be used as building or packing material.

Fibre-reinforced plate-like composite products to be used as building or packing material are known in the art. They may be provided with a protective cover, which in some cases simultaneously provide the product with a more pleasant appearance.

The problem with known fibre-reinforced composite products is that the manufacture thereof is complicated. They are also easily affected by moisture and variation in temperature, which may result in that the form of the products changes. The manufacturing methods, which are known in this connection, require considerable capital investments as well as an extensive production volume. In addition, the final product, i.e. the fibre-reinforced composite product, is subjected to excessive moisture fluctuation. An example of a known method for making fibre-reinforced composite products, such as chipboards, is the manufacture using a double belt press. The double belt press is a huge apparatus in which high-pressures, typically about 30 bar, and high temperatures, typically ranging between 150 and 200 degrees Celsius, are used. The investment costs as well as the operating costs of such an apparatus are considerable. In addition, the apparatus requires a lot of space.

U.S. Pat. No. 5,089,189 discloses a method and an apparatus for making plate-like composite products. The method and apparatus are complicated and they do not allow manufacturing economically profitably a thicker composite product that is suitable to be used as building or packing material.

BRIEF DESCRIPTION OF THE INVENTION

It is an object of the present invention to provide a method and an apparatus, which allow reducing the costs for making fibre-reinforced plate-like products so that manufacturing becomes economically profitable for both large and small manufacturing volumes. The products have typically been intended to be used within the building and packing industry, and said products will be competing with competing products of the same use. Another object of the invention is to provide a product that is in a stable form and that is advantageous to manufacture.

For this purpose, the method is characterized by the steps of: preparing the fibres into a three-dimensional cohesive fibre mat of fibres bound together, the thickness of which basically ranges between 0.5 and 0.8 mm and the width between 0.3 and 2 mm, and the length of at least 80% of the fibres is at least 100 mm, before the binding agent is applied onto the fibre mat, providing the fibre mat with a moisture content of 5% at the most before the binding agent is applied onto the fibre mat, applying the binding agent onto the fibre mat so that a mixture of fibre mat and binding agent is obtained, the mixture comprising fibres close to the upper surface thereof, which is turned against the upper pressing plates, and close to the lower surface thereof, which is turned against the lower pressing plates, placing the mixture under a pressure of at least 0.8 bar and 5 bar at the most and allowing the mixture to harden into a plate-like product having a thickness of 10 to 150 mm and comprising fibres close to the upper surface thereof and close to the lower surface thereof when transferring the mixture between the pressing plates, and removing the lower and upper laminate from the hardening product comprising fibres and binding agent.

The term fibre mat refers in this context principally to a structure made of one or more fibres that is composed of one or more fibre layers, each one of which may suitably be in the form of a three-dimensional fibre mat. If the fibre mat comprises more of such layers/mats, which is typical when thicker products are being manufactured (products having a thickness over approximately 60 mm), the layers are placed so that the finished final product comprises a layer close to both surfaces of the final product. The layers that are used in thick products (with a thickness over approximately 60 mm) need not be of the same density. Besides, a layer of lower density may be provided between the layers that are close to the surfaces of the product placed against one another.

The fibre mat is preferably prepared of hydroscopic fibres. The fibres may be natural fibres or synthetic fibres. Preferably, the moisture content of the fibres is 8% at the most and the finished fibre mat is treated so as to obtain a moisture content of 3% at the most before applying the binding agent. The fibre mat should be provided with a certain, relatively low moistness, when binding agent, for instance polyurethane, is applied onto the fibres. Consequently, the binding agent is firmly attached to the fibres, which is important in view of the physical properties of the final product, such as strength.

A final product with good physical properties is obtained when the fibre mat is being prepared of fibres that mainly have a thickness of 0.5 to 0.8 mm and a width of 0.3 to 2 mm, whereby the length of at least 80% of the fibres is at least 100 mm. Wood fibres are appropriate to be used and the binding agent may preferably be polyurethane, whereby a product of stable form and good insulation properties is obtained.

The final product is provided with the desired density and strength by exposing the mixture of fibres and binding agent, when the binding agent foams up, under a pressure of 1 to 2 bar at the most when the mixture is transferred between the pressing plates.

The preferred embodiments of the method are disclosed in the appended claims 2 to 11.

The apparatus according to the invention is characterized by comprising pressing means for creating a pressure of at least 0.8 bar towards the pressing plates, and heating means for heating the mixture of fibres and binding agent and by the upper pressing plates of the apparatus being arranged at a distance of 10 to 150 mm from the lower pressing plates.

The first substantially flat plane and the second substantially flat plane, which are determined by the upper, respectively the lower, supporting elements, need not be exactly parallel, but may form a small angle of for instance 1 to 5 degrees.

The apparatus may be referred to as a double belt conveyor or a laminator. Double belt conveyors/laminators that deviate from the present apparatus and that should be used for other purposes are already known in the art. The present invention therefore comprises the use of a double belt conveyor/laminator for manufacturing plate-like fibre-reinforced composite products.

Consequently, the apparatus according to the invention is a laminator that deviates from prior art laminators by being especially built to be able to handle the pressure that it is subjected to when manufacturing the plate-like product. Standard laminators used for manufacturing polyurethane or sandwich paneling are unable to endure a pressure that exceeds approximately 0.7 bar.

Preferably, the feed means and collecting means are arranged to transfer the upper and the lower laminate on respective end-less tracks. A continuously operating apparatus is thus obtained that is able to produce several meters of plates by using only a small amount of laminate that depending on the production volume may rotate a desired number of rounds on their respective endless tracks.

Said area within the apparatus, in which the plate is being made, in other words the area that extends from the inlet end to the outlet end, is preferably of a length that ranges between 5 and 30 m and a width that ranges between 1 and 5 m.

Preferably, the apparatus comprises a number of spray nozzles, which are placed to provide rapidly and evenly a desired amount of binding agent on the desired area of the lower laminate. The nozzles may be stationary or alternatively arranged to move back and forth above the fibre mat.

Preferably, the apparatus comprises pressing means in the form of cylinders. The cylinders allow providing the final product, before the product exits the apparatus, with a pressure of 0.8 bar, the pressure providing a suitable density for the final product, when the binding agent is polyurethane. Final products of desired size are obtained by cutting the product exiting the apparatus into desired sizes. A desired thickness is obtained by adjusting the distance between the upper and lower pressing plates, for which purpose the pressing means of the apparatus are preferably arranged. The weight ratio between fibres and binding agent in the final product may advantageously be 0.8 to 2 corresponding to an amount of 45 to 67% fibres by weight in the final product. A considerable weight ratio is aimed at (i.e. preferably closer to 2 than 0.8) in order to keep the manufacturing costs of the product low, which may increase when the amount of binding agent increases. The weight ratio may range between 0.1 and 4, i.e. the amount of wood fibre in the final product is 10 to 80%.

The preferred embodiments of the apparatus are disclosed in the appended claims 13 to 17.

The most significant advantage of the method and apparatus according to the invention is to allow manufacturing economically plate-like fibre-reinforced composite products of a stable form both in large and small production volumes, the products being suitable to be used as building or packing material. This is due to the fact that the capital expenses and operative expenses of the apparatus are low in comparison with for instance the use of a double belt conveyor, and that a fibre mat is included in the product. When the production volume remains low, the production need not take place around the clock.

The plate-like fibre-reinforced composite product according to the invention is characterized in that the thickness of the plate-like product is 10 to 150 mm, the form of the fibres resemble a three-dimensional cohesive mat, in which the fibres are surrounded by binding agent, that the thickness of the fibres mainly ranges between 0.5 and 0.8 mm and the width between 0.3 and 2 mm, and the length of at least 80% of the fibres is at least 100 mm, that the composite product comprises fibres close to the upper and lower surface, and in that the weight ratio between fibres and binding agent ranges between 0.1 and 4. Preferably, the fibre mat extends from the lower surface to the upper surface of the product. Consequently, some of the fibres extend from the lower surface up until the upper surface. The preferred embodiments of the plate-like product are disclosed in claims 19 to 21.

The most significant advantages of the composite product are that the form of product is stable, which is particularly important for building materials within the building industry, the product comprises a good strength/density ratio, and the manufacturing costs thereof remain low.

BRIEF DESCRIPTION OF THE DRAWINGS

In the following, the invention will be described in more detail in the accompanying drawing, in which FIG. 2 is a top view illustrating the apparatus in FIG. 1, FIG. 3 shows the apparatus shown in FIG. 2 according to the cutting line III-III, FIG. 4 shows a detail of the apparatus shown in FIGS. 1 to 3.

DETAILED DESCRIPTION OF THE INVENTION

Figure 1:
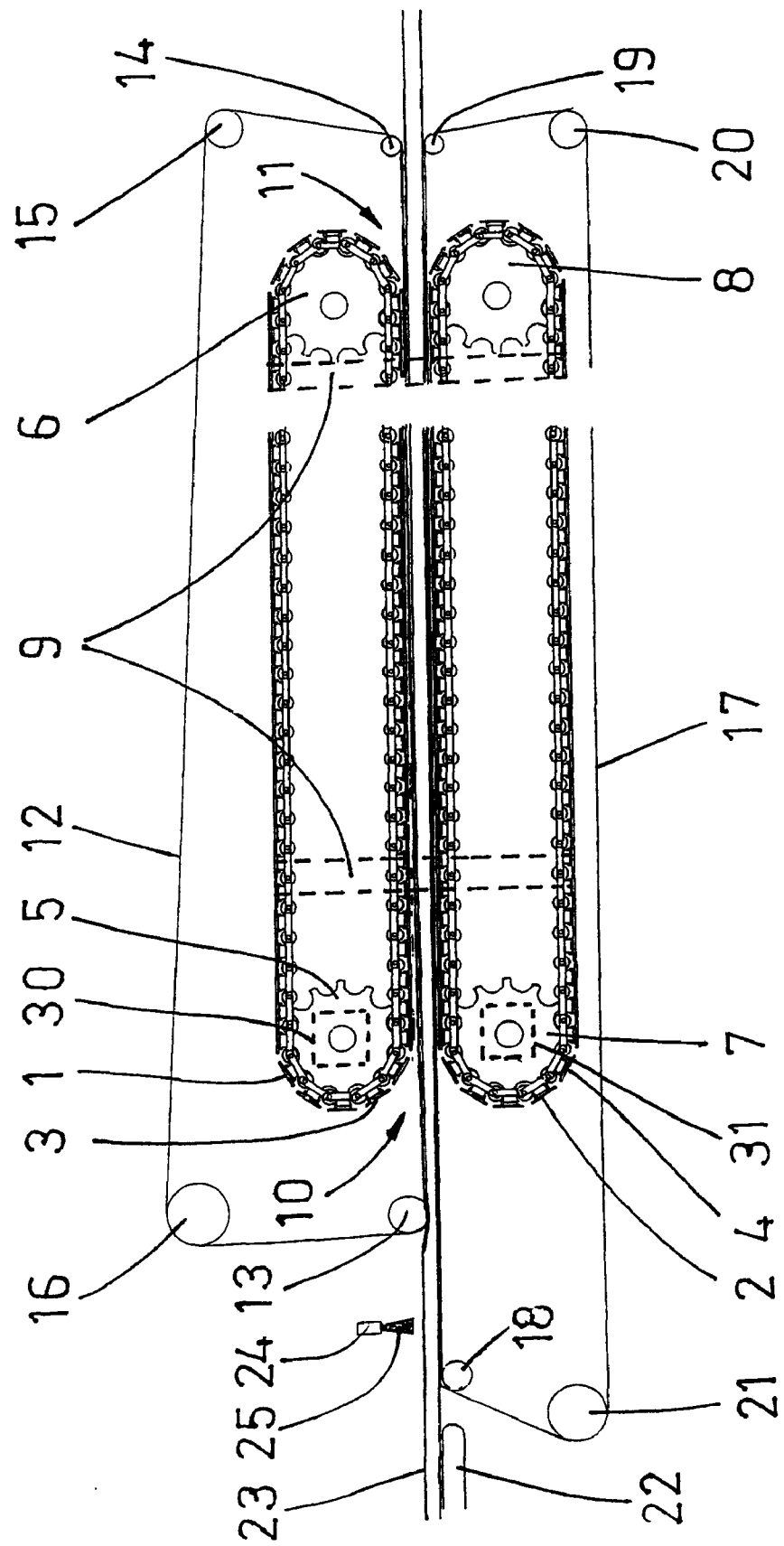
FIG. 1 is a side view showing a sketch of an apparatus.

FIG. 1 shows an apparatus for continuously making plate-like fibre-reinforced composite products, which comprise a fibre component and a binding agent. The binding agent may eventually be referred to as filler. The fibre component is composed of a fibre mat of for instance wood wool and the binding agent is for instance polyurethane, which is allowed to foam up in the apparatus so that it hardens and comprises gas cells. A product including such component parts is provided with good qualities if used as a building material, where an appropriate insulating property is required, a particular strength and measure stability under various conditions. The product can also be used for packing and eventually for other purposes. Instead of fibres based on wood and cellulose, the fibre component may basically include any fibres that allow the product to be provided with a desired strength increase in comparison with a situation in which the final product lacks the fibre component. Thus, the fibre component can for instance be made of fibreglass. Metal fibre can also be employed. In addition to polyurethane, the binding agent may be a phenol-based material.

Regardless of which binding agent is used, the fibres are embedded in the binding agent. Thus, the binding agent is fastened to the fibres so that the fibres provide a desired increase for the strength of the final product. One of the good qualities of polyurethane is that it typically has an extensive fastening ability.

The apparatus shown in FIG. 1 comprises an upper endless belt, band or track 1 and a lower endless belt, band or track 2. Both sides of the tracks are provided with side covers 26 to 29, cf. FIG. 3. The side covers 26 to 29 are not shown in FIG. 1 in order to better illustrate the inner parts of the apparatus. The side covers 26 to 29 are not necessary.

The upper track 1 comprises a plurality of pressing shoes or pressing plates 3, which can be referred to as upper pressing plates. The number of pressing plates 3 depends on the length of the apparatus; the number can for instance range between 20 and 200. The lower track 2 comprises a plurality of pressing plates 4, which can be referred to as lower pressing plates. The number of the lower pressing plates 4 corresponds to the number of upper pressing plates 3, but may be somewhat higher, since a support from above for the fibre mat and binding agent need not necessarily be placed in the vicinity of an inlet end 10. The pressing plates 3, 4 that are made of metal, such as steel or aluminium, rotate around respective cogwheels 5, 6 and 7, 8, which are driven by means of a drive motor 39 The control cabin of the apparatus is indicated with reference numeral 40. The area around the cogwheels 5 and 7 is the inlet end 10 of the apparatus, and the area around the cogwheels 6 and 8 is an outlet end of the apparatus.

In the area extending between the cogwheels 5 and 6, 7 and 8 respectively, i.e. between the inlet end 10 and the outlet end 11, the tracks 1 and 2 are substantially flat. The length of this area is typically 5 to 30 m, whereby the area from 10 to 20 m covers most of the production needs. The greater the length, the higher the operating speed of the apparatus becomes. Conveying speeds between 2 and 15 meters per minute are typically used in the apparatus. The lower track 2 starts 2 m before the upper track 1 seen from the direction in which the mixture of fibre mat and binding agent is transferred. However, said shift of the track is not shown in the drawing. The shift of the track allows providing the mixture of fibre mat and binding agent with a better support before the mixture is inserted between the upper and the lower track.

In order for the tracks 1, 2 in said area not to bend and to obtain a form that deviates from a substantially flat form, for instance owing to pressure that is formed when the binding agent foams up, the apparatus comprises a number of cylinders 9, which together with the control elements 32 keep the pressing plates 3, 4 of the apparatus flat in said area, cf. FIGS. 1 and 4. In FIG. 1, only two cylinders 9 have been shown for the sake clarity, although several cylinders may be found along the apparatus. The cylinders 9 allow adjusting the distance between the upper and the lower track depending on the thickness of the product to be manufactured. Instead of cylinders 9 other resistor/adjusting elements provided with the same functions can also be used. Both tracks 1, 2 include three control elements 32, whereof one is centrally placed and two are placed on each side between the respective edges of the control plates in the central control element, in which case the pressing plates 3, 4 may be relatively small and light without being subjected to bend when a pressure of 1 to 2 bar is placed upon them. The control elements 32 extending in the longitudinal direction of the apparatus can be referred to as rails. The pressing plates 3, 4 comprise gripping parts 38 that co-operate with the holes in respective conveyor chains 35 so that the gripping parts are inserted in the holes in order to be transferred using the conveyor chains. The conveyor chains 35 are arranged to be supported by the control elements 32, cf. FIG. 4.

The distance between the upper band 1 and the lower band 2 in the area where the binding agent may foam up is typically 10 to 30 mm, but up to 150 mm is possible when thick final products are being made. If the thickness of the final product is between 30 and 50 mm, said product may advantageously contain a fibre mat comprising a lower mat close to the lower surface of the final product and an upper mat close to the upper surface of the final product. If the thickness of the final product exceeds 60 mm, it may advantageously contain a fibre mat comprising three mats so that two more dense mats are arranged close to the upper, respectively lower, surface of the final product and a lighter (thinner) mat is arranged between the more dense mats.

Reference numeral 12 indicates an upper laminate that may endlessly rotate around the upper endless track 1. The laminate 12 is supported by four rollers or cylinders 13 to 16, whereof one cylinder 13 is placed close to the inlet end 10 of the apparatus and a second cylinder 14 is placed close to the outlet end 11 of the apparatus. The lower side of the apparatus is correspondingly provided with a lower laminate 17, which supported by cylinders 18 to 21 is able to endlessly rotate around the lower endless track 2. The Figure shows that the cylinder 18 is located further from the inlet end 10 than the cylinder 13. This is connected with the fact that binding agent should be applied onto the fibre mat before the fibre mat and binding agent arrive at the inlet end 10.

The upper and the lower laminate 12, respectively 17, are preferably made of polyethylene foil. A foil of some other material can be employed, in which case the foil should be of such a material that the binding agent (such as polyurethane) is not attached to the foil. Polytetrafluoroethylene (PTFE), or what is known as Teflon, is an example of such a material.

In FIG. 1, reference numeral 22 indicates a conveyor by means of which the fibre mat 23 is fed onto the lower laminate 17 and towards the inlet end 10 of the apparatus. In the area between the cylinders 18 and 13, the area being referred to as an application area, is provided with a number of sprinklers or spray nozzles 24 by means of which binding agent 25 is injected onto the lower laminate 17. The number of spray nozzles 24 may vary: the greater the product and the higher the speed, the larger the number of spray nozzles required in general. The number of spray nozzles 24 may vary for instance between 3 and 100. The spray nozzles 24 can preferably be arranged to move back and forth in the transverse direction in relation to the longitudinal direction of the apparatus, whereby the number of spray nozzles may be small; it is also possible that the apparatus is provided with only a single spray nozzle. In the cylinder 13, the upper laminate 12 encounters the mixture of fibre mat 23 and binding agent 25. It can be said that the upper and the lower laminate 12, respectively 17, provide the mixture with a kind of form. Within the area between the inlet end 10 and the outlet end 11, the mixture of fibre mat and binding agent is allowed to foam up and harden so that a hardened flat product is provided at the outlet end that is covered with laminate 12, 17 on both sides. The laminates 12, 17 are removed at the cylinders 14 and 19. The laminates 12, 17 rotate on the respective endless tracks by means of frictional force that is found in the area between the inlet end 10 and the outlet end 11. Alternatively, it is possible that a drive cylinder makes the laminates 12, 17 rotate, whereby one of the cylinders 13 to 16, respectively 18 to 21 are driving.

FIG. 2 shows a top view of the apparatus. In FIG. 2, the upper laminate 12 is not shown; and the cylinders 14 to 16 are illustrated with a dashed line. The width of the pressing plates 3, 4 is 3 m, but the width may be greater, up to 5 m, if very broad products are to be manufactured. The pressing plates 3, 4 may also be considerably smaller than 3 m, but smaller than 1 m are not to be recommended.

FIG. 3 shows the apparatus in the longitudinal direction in cross section of line III-III in FIG. 2. The Figure shows that the tracks 1, 2 on both sides are provided with side covers 26 to 29.

Figure 5:
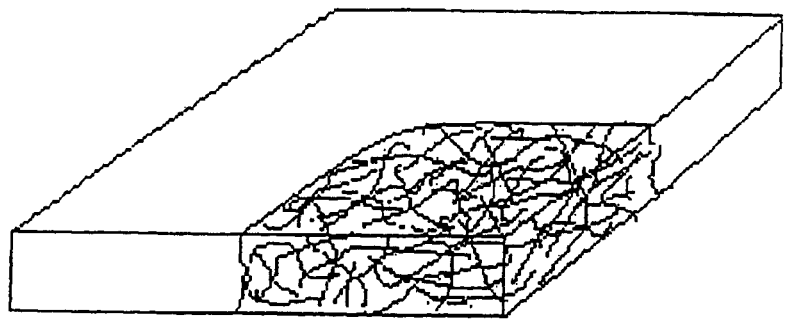
FIG. 5 illustrates a product according to the invention, and FIG. 6 schematically shows a method according to the invention.

FIG. 5 shows a plate-like fibre-reinforced composite product according to the invention. The Figure shows that the fibres extend from the lower surface of the product to the upper surface thereof so that the fibres are found throughout the product. Some fibres go right through the product.

Figure 6:
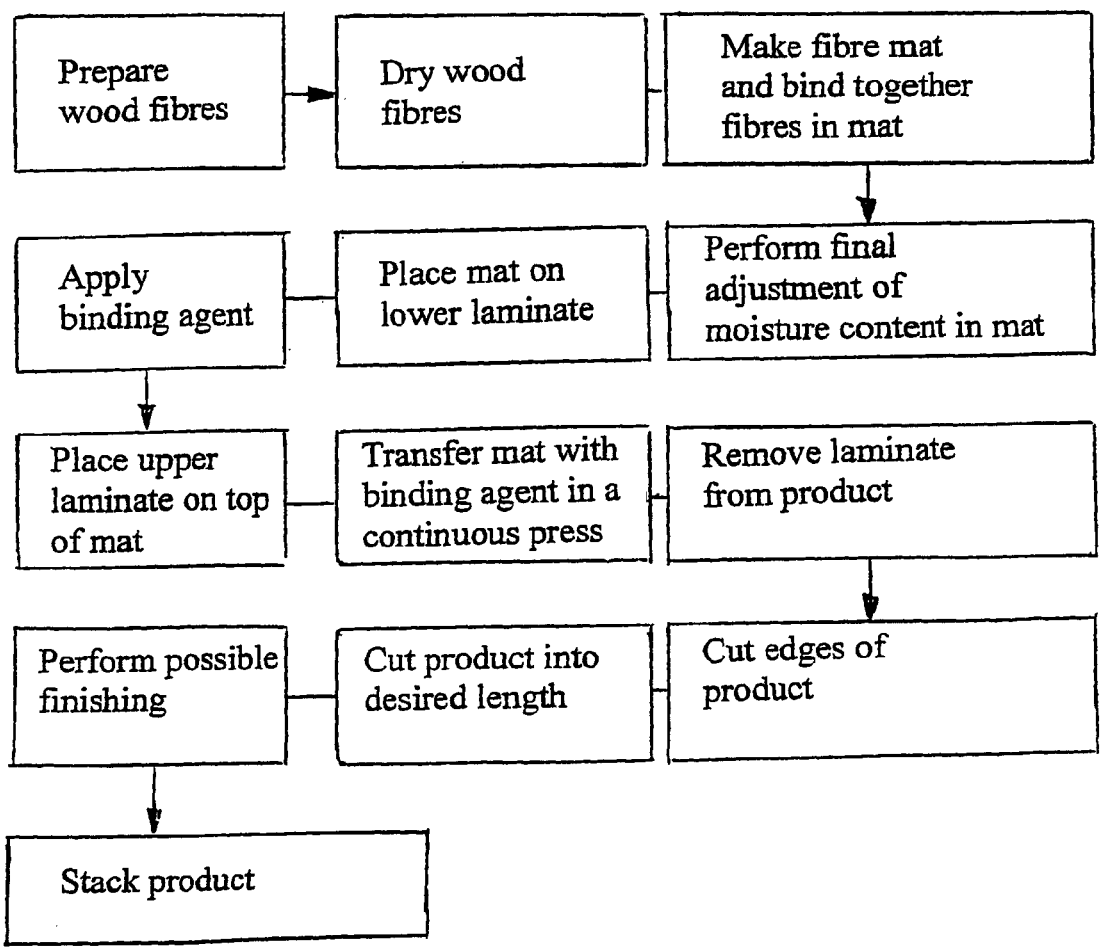

In the following with reference to FIG. 6, the method for making the plate-like fibre-reinforced composite products by means of the apparatus shown in FIGS. 1 to 3 is described in more detail.

Wood fibres having a thickness of 0.5 to 0.8 mm and a width of 0.3 to 2 mm are manufactured. The fibres are dried so that the moisture content thereof remains very low; the moisture content should not exceed 8%. The length of the fibres may vary between 8 and 250 mm. A three-dimensional fibre mat 23 is prepared of such fibres, whereof preferably 80% are at least 100 mm long. Such a mat is kept together during the entire manufacturing process.

The fibre mat 23 is provided with moisture content of 3 to 4%. The desired moisture content is achieved with appropriate dryers/dampers. If the moisture content exceeds said value, the final product remains poor. The moisture content should therefore exceed the value 0.5%. As it is not technically difficult to achieve the last-mentioned moisture interval, and as a person skilled in the art simply knows which type of dryer/damper can be used, the structure of such a dryer/damper is not explained in more detail herein.

The fibre mat 23 provided with a moisture content of 4% at the most or in some cases 5% at the most is made stable by binding together the fibres thereof. Binding together allows maintaining the fibres in the fibre mat together and the fibres are not spread apart in an undesirable manner when applying the binding agent (polyurethane).

The fibre mat 23 is controlled by a speed of 7 meters per minute on the lower laminate 17 and polyurethane in liquid form is injected onto the fibre mat by means of the spray nozzles 24. The fibre mat 23 that is surrounded by polyurethane in liquid form is transferred towards the cylinder 13, in which the mixture is provided on the upper side thereof with an upper laminate. The mixture of fibre mat and polyurethane is found between the upper and lower laminate. It is possible in addition thereto to provide, if desired, the sides with additional stops, which prevent the polyurethane from running out of the sides. This is normally not necessary, since the polyurethane flows relatively slowly and hardens rapidly when conveyed in the apparatus.

The mixture of fibre mat 23 and polyurethane is transferred between the endless belts 1, 2 and is allowed to foam up and harden between them. A pressure of at least 0.8 bar and 2 bar at the most is applied onto the mixture of fibre mat and polyurethane within the area between the belts 1, 2. No particular pressure should be provided at the inlet end 10, but especially in the latter half of the apparatus, i.e. in the part of the apparatus that is placed between the outlet end 11 and the middle of the apparatus, the pressure of 1 to 2 bar should be on hand. Higher pressures are not required and would only be of disadvantage. When the polyurethane foams up and hardens, the temperature is at least 30 degrees Celsius between the belts 1, 2. Since the polyurethane undergoes an exothermic reaction, in other words generates heat when it foams up, the pressing plates are heated to avoid heat shocks using infrared radiation emitting heating lamps 30, 31, which are schematically indicated by a dashed line in FIG. 1. On account of the heating, the temperature of the pressing plates does not differ too much from the temperature of the foamed polyurethane, which ranges between 30 and 90 degrees Celsius. Excessive differences in temperature may result in heat shocks providing a poorer product as a result. Heating of the pressing plates is typically required only when the apparatus is started; when the apparatus has been in motion for a while the pressing plates obtain an appropriate temperature, which is maintained with the temperature that the foamed-up polyurethane provides the pressing plates. Instead of heating lamps arranged between the cogwheels 5, 6, other types of heating arrangements can also be used. A temperature exceeding 100 degrees Celsius should not be provided between the belts, since high temperatures are only of disadvantage and would increase production costs. The laminates 12 and 17 are removed from the hardening product after having exited the outlet end 11. Hereafter the sides are made straight and the product is cut into a desired length. In the final product, the weight ratio between fibres and binding agent ranges between 0.8 and 2, typically between 1 and 1.3. The foamed-up polyurethane is provided with a density of 25 to 100 kg/m$^3$.

For a product having a thickness of 10 mm, a fibre mat with a thickness of 15 to 30 mm is used as a starting material. For a final product having a thickness of approximately 50 mm at the most, a fibre mat with a thickness of 70 to 150 mm is employed. If the thickness of the final product is 100 mm, two fibre mats are used, which are provided with a thickness of 70 to 150 mm each. If the thickness of the final product is 150 mm, three fibre mats are preferably used having a thickness of 70 to 150 mm each. In products, in which the fibre mat is composed of several layers (fibre mats), it is possible during the manufacturing process of the final product to apply binding agent between the layers so as to achieve an appropriate adhesion.

The invention has above been described merely by means of examples and it is therefore pointed out that the details of the invention can be implemented in various ways within the scope of the appended claims. It is therefore possible to use for instance as starting material other hygroscopic fibres than wood fibres. The advantage with wood fibres is, however, to provide a final product provided with good physical and mechanical properties; the production costs of such a product thus remaining very low. Instead of polyurethane, a phenol-based material can also be employed. The conveying speed in the apparatus may also vary, whereby the speed typically ranges between 2 and 15 meters per minute. The dimensions of the final product may vary. The number of spray nozzles may vary: it is possible to use one or more nozzles, which instead of being stationary may be arranged to move in the transverse direction in relation to the direction in which the fibre mat 23 moves. Another type of traversing spray arrangement than spray nozzles can also be used. Instead of spray nozzles 24, the fibre mat can be provided with a binding material through tubes or by pouring by means of one or more grooves. Feed apparatuses for feeding and collecting the laminates 12, 17 may vary in detail, for instance, so that a different number of cylinders 13 to 16, 18 to 21 is used. The feed apparatuses need not be arranged to feed the laminate 12, 17 on a continuous track, although this is to be recommended. Consequently, the laminates can alternatively be collected.

What is claimed is:

1. A plate-like fiber-reinforced composite stable product comprising fibers surrounded by a binding agent to be used as building or packing material, the composite product comprising fibers close to the upper and lower surface of the product, wherein the fibers are in a form resembling a three-dimensional cohesive mat, the fibers having a thickness mainly ranging between 0.5 mm and 0.8 mm and a width between 0.3 mm and 2 mm, and at least 80% of the fibers having a length of at least 100 mm, the fibers and binding agent having a weight ratio ranging between 0.8 and 2 and the plate-like product having a thickness of 10 mm to 150 mm.

2. A plate-like fiber-reinforced composite product as claimed in claim 1, wherein the binding agent is polyurethane.

3. A plate-like fiber-reinforced composite product as claimed in claim 2, wherein the product is not covered.

* * * * *